US006943664B2

(12) United States Patent
Brillon et al.

(10) Patent No.: US 6,943,664 B2
(45) Date of Patent: Sep. 13, 2005

(54) PROCESS FOR CONTROLLING THE RESYNCHRONIZATION OF A REMOTE CONTROL WITH A CHANGING CODE

(75) Inventors: Alain Brillon, Villeneuve Tolosane (FR); Bachir Ayeva, Toulouse (FR)

(73) Assignee: Siemens VDO Automotive, Toulouse Cedex (FR)

( * ) Notice: Subject to any disclaimer, the term of this patent is extended or adjusted under 35 U.S.C. 154(b) by 389 days.

(21) Appl. No.: 10/201,898

(22) Filed: Jul. 25, 2002

(65) Prior Publication Data

US 2003/0020596 A1 Jan. 30, 2003

(30) Foreign Application Priority Data

Jul. 27, 2001 (FR) .......................................... 01 10112

(51) Int. Cl.[7] ................................................ H04Q 1/00

(52) U.S. Cl. .................... 340/5.61; 340/5.26; 340/5.72; 380/265; 380/46

(58) Field of Search .............................. 340/5.61, 5.26, 340/5.72; 380/274, 262, 46, 265

(56) References Cited

U.S. PATENT DOCUMENTS 4,509,093 A * 4/1985 Stellberger ................. 340/5.26
5,191,610 A 3/1993 Hill et al.
5,241,598 A * 8/1993 Raith ........................ 340/5.26
5,377,270 A * 12/1994 Koopman et al. ......... 340/5.26
5,600,324 A 2/1997 Reed et al.
5,646,996 A 7/1997 Latka
5,680,131 A * 10/1997 Utz ........................... 340/5.26
6,130,622 A 10/2000 Hussey et al.

FOREIGN PATENT DOCUMENTS

EP 0 857 842 8/1998
EP 1 093 101 4/2001
FR 2 774 120 7/1999
FR 2 799 862 4/2001

* cited by examiner

*Primary Examiner*—Brian Zimmerman
(74) *Attorney, Agent, or Firm*—Young & Thompson

(57) ABSTRACT

This process comprises the following steps:

detection of the need for resynchronization, identification of a desynchronized badge and memorization in a computer of a corresponding code, memorization of the message sent by the computer to the badges, and emission of the modified message (step 70), reception of the modified message by the desynchronized remote control, automatic resynchronization between the remote control and the computer, and emission of a response to the message from the computer, reception of the response from the badge by the computer, and erasure of the memory and return to the base message.

5 Claims, 1 Drawing Sheet

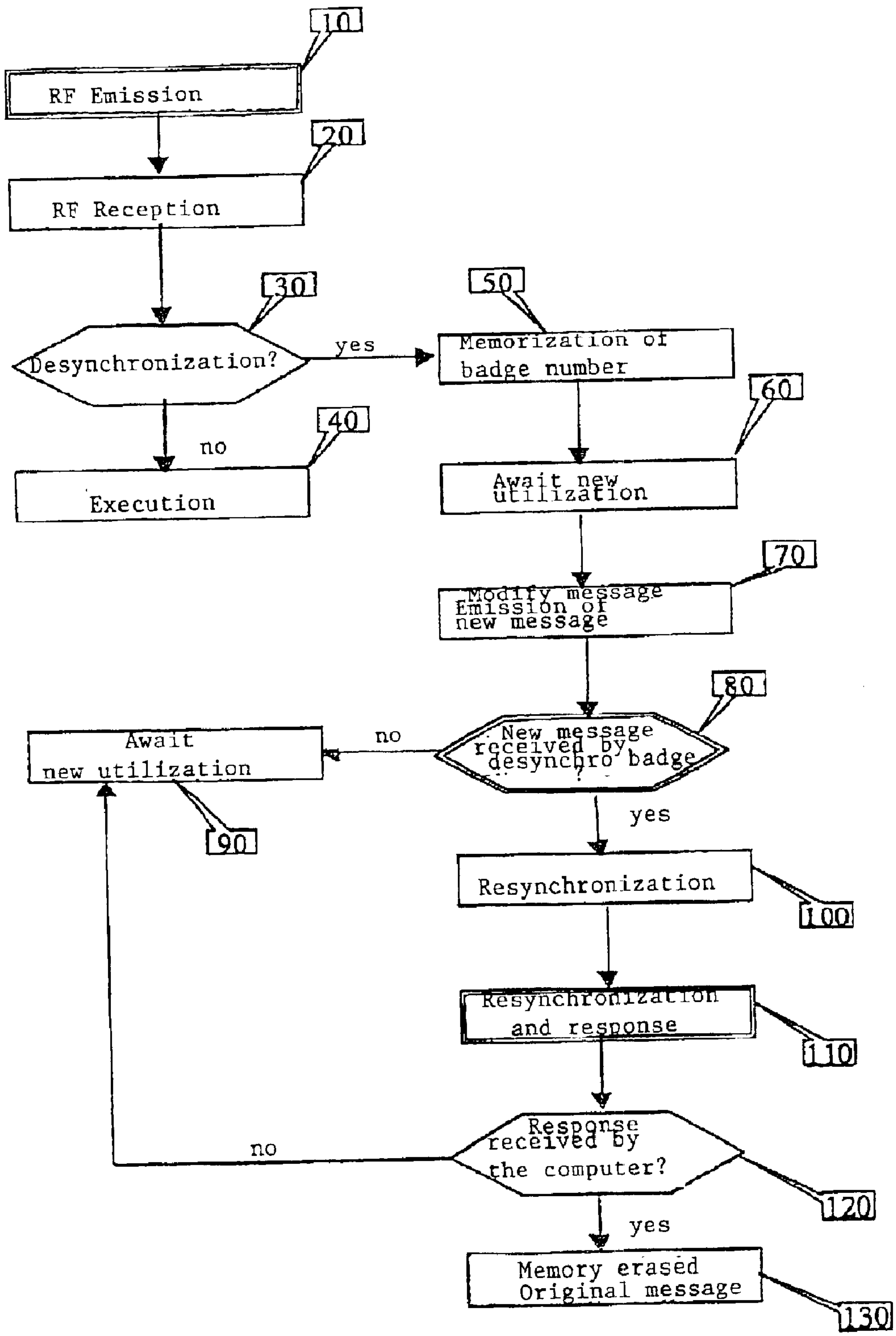
10
RF Emission
20
RF Reception
30
Desynchronization?
yes
50
Memorization of badge number
no
40
Execution
60
Await new utilization
70
Modify message Emission of new message
80
New message received by desynchro badge ?
no
Await new utilization
90
yes
Resynchronization
100
Resynchronization and response
110
Response received by the computer?
no
120
yes
Memory erased Original message
130

PROCESS FOR CONTROLLING THE RESYNCHRONIZATION OF A REMOTE CONTROL WITH A CHANGING CODE

FIELD OF THE INVENTION

The present invention relates to a process for controlling the automatic synchronization between a remote control key and an associated computer. For example, it concerns a remote control for locking/unlocking car doors.

BACKGROUND OF THE INVENTION

Such remote control is widely used at present. It permits, for example, remotely opening or closing vehicle doors. To do this, and so as to avoid any fraud or unauthorized opening, the codes emitted, between the key and the computer controlling locking/unlocking of the doors, no longer use fixed codes but so-called changing codes.

Thus, if the code emitted by the key is always the same, as was previously the case, it would suffice for an intruder to recopy this code so as thereafter to have access to the vehicle without difficulty. To avoid this fraud, the codes emitted between the key and the computer are so-called changing codes. Such codes are calculated at each emission from an algorithm known to the key and the computer as a function of the preceding code plus an increment. Such changing codes give good results, because the code emitted by the key toward the given vehicle is never the same. Thus, it no longer suffices to copy an emitted code to have access to the vehicle.

However, this type of code has a serious drawback, namely a risk of desynchronization between the key and the computer. Thus, each of these devices (key and computer) computes according to a same algorithm a code, but this in an entirely independent manner. Thus, if for any reason the last code emitted by the key and the last code received by the computer are not the same, it is no longer possible remotely to control the computer from the key. This happens particularly when one presses on the key. There is a desynchronization. Slight desynchronizations (which is to say if the key is fast by one-fiftieth of a code on the computer) have already been solved and this will not be treated in detail here. On the other hand, large desynchronizations (the computer and the key no longer have, in their code lists, common elements) remain a serious problem.

Publications in the prior art disclose processes for resynchronization between the key and the computer in the case of large desynchronizations. There can thus for example be cited FR-2 799 862, which discloses a process for automatic resynchronization in which, when desynchronization has been detected, the computer emits a first message comprising a desynchronization code, a challenge code and its associated response code. The key then emits its own response to the challenge code sent by the computer and memorizes the challenge code as a new base code. The computer receives and analyzes the message sent by the key and verifies that the response code sent by the key is correct and in this case the computer uses the challenge code as the new base code.

U.S. Pat. Nos. 5,191,610 and 5,646,996, and EP0 857 842 disclose other processes permitting resynchronization between an emitter and a receiver. In all these documents, the resynchronization is generally provided to be carried out by a transponder or the like. The computer then knows that the key with which it communicates is desynchronized.

In the present invention, we deal with the case in which the vehicle is provided with a so-called hands free access system. The user of the vehicle is then simply provided with an electronic card, also called a badge, which is detected and recognized by a control and management device associated with the antennas onboard the vehicle. If the card is identified by the control and management device as being a card authorized by the vehicle, the bearer of this card can enter the vehicle simply by operating a door handle. In certain systems, it is also provided that the carrier of the badge can start the motor of the vehicle by simply action on a button.

The problem which thus arises is that there is no longer a transponder to carry out resynchronization. In opening and starting systems which are not hands free systems, there are used changing codes to open and close the vehicle. The resynchronization takes places when the mechanical key is emplaced in the lock to effect starting of the vehicle. With a hands free system, this maneuver is no longer carried out and starting the vehicle is no longer controlled by means of a transponder but by a communication of the challenge/response type between a badge and the management system of the vehicle.

SUMMARY OF THE INVENTION

The present invention thus has for its object providing a process permitting carrying out resynchronization with a hands free system in which no transponder is available.

To this end, it provides a process for controlling the resynchronization of a remote control with a changing code used with a hands free system comprising at least a badge, a computer, emitter and receiver means provided to permit the computer to communicate with each badge, each badge integrating a remote control with a changing code.

According to the invention, this process comprises the following steps:

- detection of the need for resynchronization between a remote control and the computer following an emission from this remote control,
- identification of the badge associated with the desynchronized remote control and memorization in the computer of the fact that the remote control of the identified badge is desynchronized,
- modification of the message sent by the computer to the badges to include therein a code indicating that a remote control is desynchronized and identifying the corresponding badge, and emission of this modified message, this modified message not changing the operation of the hands free system when it is received by a badge including an undesynchronized remote control,
- reception of the message modified by the badge including the desynchronized remote control,
- automatic resynchronization between the remote control associated with this badge and the computer, and emission of a response to the message of the computer,
- reception of the response of the badge by the computer, and
- erasure of the memory and inverse modification of the messages sent by the computer so as ultimately to emit base messages.

This process permits using dialogue means used for the hands free function to send a resynchronization command to the remote control of the system which is desynchronized.

The messages sent to the badges by the computer are emitted for example with the help of low frequency electromagnetic signals of about 125 kHz, whilst the responses of the badges to the computer are emitted for example with the help of radio frequency electromagnetic signals of about 433 MHz.

In a preferred practice of the process according to the invention, the modification of the message consists in adding to the base message a code function indicating that a remote control is desynchronized as well as a code identifying the badge that includes the remote control to be resynchronized. It can be provided that the unmodified base message comprises a random challenge code and thus, to limit the modifications and not to have a modified message of a size substantially greater than the base message, the code identifying the badge can be integrated with this challenge code of the modified message.

The modified message is preferably repeated until resynchronization.

The resynchronization carried out in the process according to the invention can be performed according to numerous resynchronization processes. A resynchronization process that can be used here is disclosed in FR 2 799 862. The resynchronization is thus preferably carried out according to the following process, which comprises:

emission by the computer of a message comprising a desynchronization code, a so-called challenge code and its associated response code as determined by the computer according to an algorithm belonging to the computer and known by the remote control, reception by the remote control of the first message and its analysis so as to instruct the remote control of the desynchronization and to validate the response code sent by the computer, emission by the remote control of a second message comprising its own response to this same challenge code, this response being determined from an algorithm belonging to the remote control and known to the computer, memorization by the remote control of the challenge code sent by the computer as a base code, and reception by the computer of the second message and its analysis, to verify that the response code sent is actually that of the remote control belonging to the vehicle and in this case the computer is resynchronized with the remote control by using the challenge code as the new base code.

BRIEF DESCRIPTION OF THE DRAWINGS

The present invention will be better understood from the description which follows, given with reference to the accompanying schematic drawing, in which:

The single FIGURE is a flow chart of the process according to the invention.

DETAILED DESCRIPTION OF THE INVENTION

There will herein be considered a vehicle provided with a hands free access system as well as a remote control with a changing code. The hands free access system permit a user to access the vehicle to lock and unlock its doors without having to use a conventional mechanical key. The user simply carries a badge which for example can be in the form of an electronic card. The detection of this badge and its identification permit locking and unlocking when the user desires and has the badge with him. Such a system is already known in the automotive field. The remote control system with a changing code is itself used to permit the remote locking/unlocking of the doors of vehicles.

In the present case, the badges of the hands free access system each include a remote control. Supplementally, there can also be integrated a mechanical key insert into each of these badges.

Each badge is provided with an electronic unit, an RF (radio frequency) signal emitter, an LF (low frequency) receiver, means for creating an RF signal, batteries as well as the remote control and if desired a mechanical key insert. Such means are known to those skilled in the art and are not described here in detail. It is similarly stated that the electronic unit of each badge comprises moreover a memory permitting memorizing a part of an algorithm AV belonging to the vehicle as well as an algorithm AT belonging to the remote control. The electronic unit of each badge is moreover adapted to regulate the assembly of the electronic means of the badge, including the remote control.

The frequency used for RF signals is for example 433 MHz, whilst that of the LF signals is for example 125 kHz.

Similarly, the vehicle is provided with a computer, LF signal emitting antennas, an antenna for receiving RF signals, and means for creation of LF signals. The computer comprises a memory permitting memorizing the AV and AT algorithms mentioned above. The computer mounted onboard the vehicle permits among other things the control of locking and unlocking of the doors of the vehicle and signals emitted and received to carry out hands free and remote control access functions.

As indicated above, the remote control operates with a changing code.

As shown in the accompanying drawing, when a remote control and the computer of the vehicle are synchronized, sending a locking control C or unlocking control D (step 10) by the remote control is received (step 20) by the computer of the vehicle. This computer thus controls the locking C or unlocking D (step 40) of the doors, after verification (step 30) that the code used by the key is in fact on its list of available codes. In a manner known per se, the available code list is continuously brought up to date.

To facilitate reading the accompanying figure, the operations carried out by the remote control are presented in a frame with a double border, whilst the operations carried out by the computer of the vehicle are given in a frame with a single border.

In the present case in which the remote control and the computer of the vehicle are desynchronized, the computer of the vehicle receives a remote control frame from a badge of the system but outside the range of the authorized codes available to the computer. The badge is thus identified by its fixed code. Thus, in the remote control frame, a portion is fixed whilst a portion varies, integrating the changing code, which changes at each emission. The computer will thus memorize on the one hand that a remote control of a badge is desynchronized and on the other hand a number identifying the desynchronized badge.

The remote control being desynchronized, the remote control function becomes inoperative. It must wait on a resynchronization so that this function can once more become operative. However, the user will have access to his vehicle. He can either use the hands free function or use a mechanical insert to control a lock of his vehicle.

When the computer of the vehicle has memorized (step 50) that a badge is desynchronized, it awaits a new use of the hands free function (step 60). As soon as the following use of this function takes place, it modifies the messages that it sends until there is resynchronization between the badge and the computer of the vehicle. These modified messages will be repeated until there is resynchronization. The messages sent by the computer are messages relating to the hands free access system. It is for example a message to locate the badges. The communication between the badges and the computer of the vehicle, as to the hands free access system, is of the challenge/response type. The vehicle computer thus sends a challenge (question) and the badges receiving this challenge response. The challenge is generally random and the response is determined as a function of the algorithm known both to the computer and to the badge.

The modified messages sent by the computer of the vehicle, following detection of desynchronization, comprise always a challenge. To this challenge is added to code indicating that desynchronized badge has been detected. This code can be very simple and be composed for example of only a single bit. The new message also integrates a code identifying the desynchronized badge. So as not to increase the size of the message, this code is for example integrated into the challenge sent by the computer of the vehicle. It can for example be supposed that the three last bits of the challenge are replaced by a code identifying the desynchronized badge. Thus, the structure of the modified message is very little different from a base message, which is to say before modification. These message modifications do not in any way impair the hands free function which can be normally fulfilled. Thus, if an undesynchronized badge receives a modified message, it will normally interpret this message and respond to it as if it were a conventional base message.

When a modified message is emitted (step 70), it is necessary to determine (step 80) whether this modified message has been received by the desynchronized badge. If this message is not received by the desynchronized badge, it must await a new use of the hands free system and hence the emission of a new message (step 60) to be able to carry out a resynchronization.

If now the desynchronized badge is present and receives a modified message from the computer of the vehicle, then a resynchronization of the remote control (step 110) and of the computer (step 100) of the vehicle will take place automatically as described above. The desynchronized badge resynchronizes and also responds to the challenge contained in the modified message sent by the computer of the vehicle (step 110).

Resynchronization is for example carried out according to the process described in FR 2 799 862 to which reference is made here. The resynchronization process thus comprises for example the following steps:

- emission by the computer of a first message comprising a desynchronization code, a so-called challenge code and its associated response code as determined by the computer according to an algorithm associated with said computer and known to the remote control,
- reception by the remote control of the first message and it analysis so as to inform the remote control of the desynchronization and to validate the response code sent by the computer,
- emission by the remote control of a second message comprising its own response to this same challenge code, this response being predetermined from an algorithm belonging to the remote control and known to the computer,
- memorization by the remote control of the challenge code sent by the computer as a base code, and
- reception by the computer of the second message and its analysis, to verify that the response code sent is indeed that of the remote control belonging to the vehicle and in this case the computer resynchronizes itself with the remote control by using the challenge code as the new base code.

When it is here a question of reception or emission by the remote control, there is a communication carried out by the hands free function of the system and transmits by the electronic unit of the badge from or toward the remote control integrated in the badge.

In this process, the challenge code emitted by the computer is for example a random code. The exchanges between the badge and its remote control and the computer are for example carried out with the help of RF signals of the same frequency as those used in the hands free system. There can be selected the frequency usually used, 433 MHz.

The new base code in question in the resynchronization procedure is preferably a function of the challenge code used for this resynchronization.

Once resynchronization is effected, if the response of the badge emitted toward the computer of the vehicle is received by this latter (step 120), then it can be supposed that the remote control has received and executed the resynchronization command. The memory of the computer of the vehicle relating to the desynchronized badge can then be erased (step 130).

The resynchronization procedure is thus terminated. The remote control and access functions, and if desired the starting function, and hands free, thus operate normally until the detection of a new desynchronization.

When several badge remote controls are desynchronized, several solutions can be envisaged to carry out resynchronization. It can in the first instance be supposed that the computer takes account only of a single desynchronized badge. It thus awaits this badge being resynchronized to take into account the desynchronization of another remote control. It is also possible to memorize in the computer of the vehicle several codes to identify all the desynchronized badges. The modified messages thus comprise no longer a single code identifying one desynchronized badge, but a plurality of such codes.

Of course, the response from the badge comprises a code permitting identifying this badge.

The process described above thus permits, when a vehicle is provided with a hands free system, using dialogue means of the hands free system to trigger a resynchronization of a remote control with a changing code.

The procedure as described above also permits avoiding resynchronization of a badge, or of a remote control, which is not desynchronized. In theory, resynchronization between an un-desynchronized badge and the computer of the vehicle should not pose a problem. However, it can happen, in the course of resynchronization, following a parasitic emission, that the resynchronization does not take place correctly. It is accordingly preferable to limit the number of resynchronizations to limit the number of problems. This is the case for the process described above because only the desynchronized badges are resynchronized.

It follows that the present invention is not limited to the process described above by way of non-limiting example, but also relates to all modified processes within the scope of those skilled in the art, within the scope of the following claims.

What is claimed is:

1. Process for controlling the resynchronization of a remote control with a changing code used with a hands free system comprising at least one badge, a computer, emitting and receiving means provided to permit the computer to communicate with each badge, each badge including a remote control with a changing code, characterized in that it comprises the following steps:

- detection (step 30) of the need for resynchronization between a remote control and the computer following an emission (step 10) of this remote control, identification of the badge associated with the desynchronized remote control and memorization in the computer of the fact that the remote control of the identified badge is desynchronized (step 50), modification of the message sent by the computer to the badges to include therein a code indicating that a remote control is desynchronized and identifying the corresponding badge, and emission of this modified message (step 70), this modified message not changing the operation of the hands free system when it is received by a badge integrating an undesynchronized remote control, reception of the modified message by the badge including the desynchronized remote control, automatic resynchronization (steps 100 and 110) between the remote control associated with this badge and the computer, and emission of a response to the message of the computer, reception of the response of the badge by the computer, and erasure of the memory and inverse modification of the messages sent by the computer so as ultimately to emit base messages (step 130), wherein the modification of the message (step 50) consists in adding to the message a function code indicating that a remote control is desynchronized as well as a code identifying the badge including the remote control to be resynchronized; and wherein the unmodified base message comprises a random challenge code which is included in the modified message and in that the code identifying the badge is included in this challenge code of the modified message.

2. Process according to claim 1, characterized in that the modified message is repeated until resynchronization between the remote control and the computer.

3. Process according to claim 1, characterized in that the messages sent to the badges by the computer are emitted with the help of a low frequency electromagnetic signal of about 125 kHz.

4. Process according to claim 1, characterized in that the responses from the badges to the computer are emitted with the help of a radio frequency electromagnetic signal of about 433 MHz.

5. Process according to claim 1, characterized in that the resynchronization is carried out according to the following process, which comprises:

the emission by the computer of a first message comprising a desynchronization code, a so-called challenge code and its associated response code as determined by the computer according to an algorithm belonging to said computer and known to the telecontrol, reception by the remote control of the first message and its analysis so as to inform the remote control of the desynchronization and to validate the response code sent by the computer, emission by the remote control of a second message comprising its own response to this challenge code, this response being determined from an algorithm belonging to the remote control and known to the computer, memorization by the remote control of the challenge code sent by the computer as base code, and reception by the computer of the second message and its analysis, to verify that the sent response code is indeed that of the remote control belonging to the vehicle and in this case the computer resynchronizes itself with the remote control by using the challenge code as a new base code.

* * * * *